United States Patent [19]

Hill

[11] Patent Number: 4,643,680

[45] Date of Patent: Feb. 17, 1987

[54] VOWEL SOUND TEACHING DEVICE

[76] Inventor: John Hill, 2099 Lawrence Avenue West, Apartment 908, Weston, Ontario, Canada, M9N 1H9

[21] Appl. No.: 776,494

[22] Filed: Sep. 16, 1985

[30] Foreign Application Priority Data

Oct. 30, 1984 [GB] United Kingdom ............... 8427365

[51] Int. Cl.⁴ .............................................. G09B 1/22
[52] U.S. Cl. .................................... 434/170; 434/174
[58] Field of Search ...................... 434/174, 170, 173

[56] References Cited

U.S. PATENT DOCUMENTS

| 1,833,793 | 11/1931 | Pfleger | 434/174 |
| 2,437,090 | 3/1948 | Gold | 434/174 |
| 2,810,211 | 10/1957 | Zesbaugh | 434/174 |
| 3,110,116 | 11/1963 | Ezra | 434/174 |
| 3,200,517 | 8/1965 | D'Agostino | 434/174 |

FOREIGN PATENT DOCUMENTS

| 622219 | 7/1960 | Canada | 434/170 |
| 11313 | of 1893 | United Kingdom | 434/174 |
| 136289 | 12/1919 | United Kingdom | 434/174 |
| 749001 | 5/1956 | United Kingdom | 434/174 |
| 1547824 | 6/1979 | United Kingdom | 434/173 |

Primary Examiner—William H. Grieb
Attorney, Agent, or Firm—Sim & McBurney

[57] ABSTRACT

An educational device useful in the teaching of pronunciation and spelling is disclosed. The device takes a generally planar shape and has a display window in which letters of a desired word are displayed. The letters are provided on rotatable discs, which may be three or five in number, which are individually manipulated to form the words. One of the rotatable discs bears a plurality of different visually-recognizable vowel symbols, each different vowel symbol being colored or being displayed on a colored background. The pronunciation of the vowel in the name of the color has a phonetic relationship with the desired pronunciation of the respective vowel symbol, so as to aid the student in achieving the correct pronunciation of the word displayed in the window.

15 Claims, 5 Drawing Figures

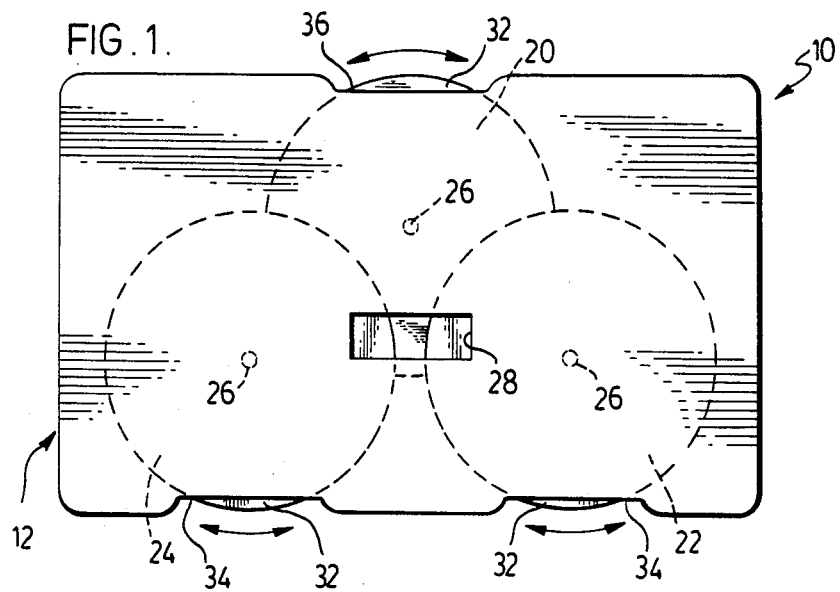
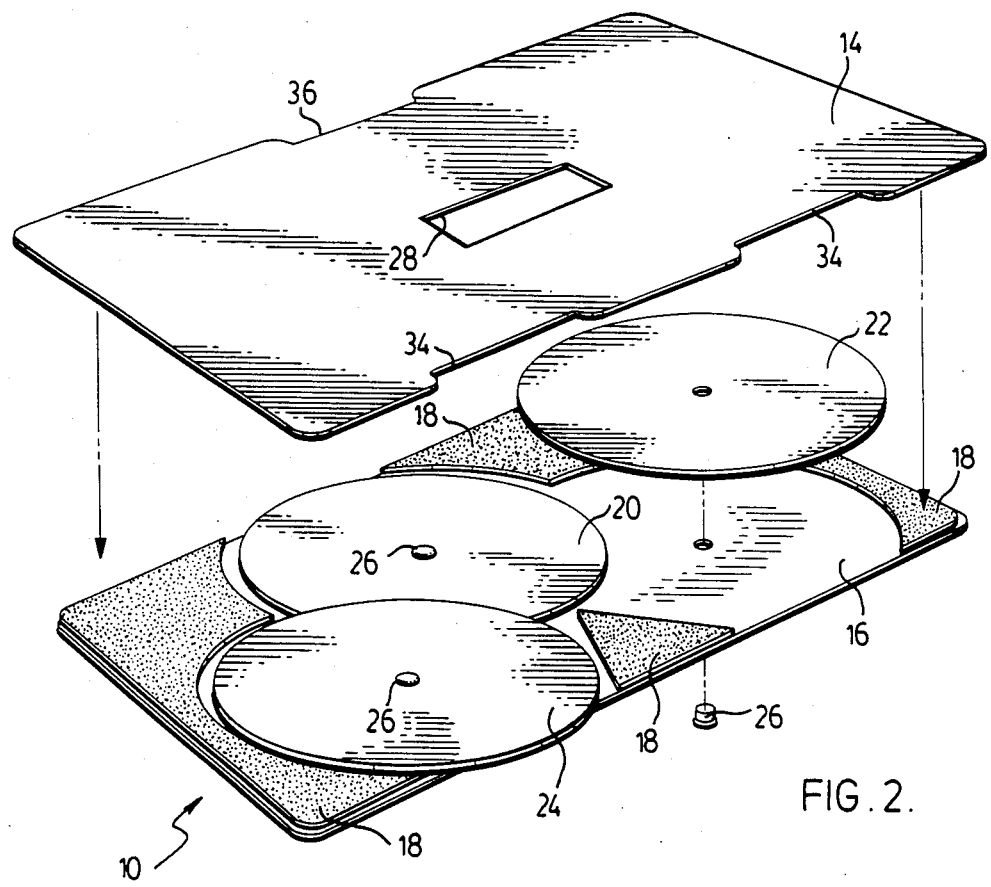

VOWEL SOUND TEACHING DEVICE

FIELD OF INVENTION

The present invention relates to an improved educational device for teaching word recognition.

BACKGROUND TO THE INVENTION

In my prior U.K. Pat. No. 1,547,824, I have described and claimed an educational device to assist in the learning of word pronunciation, recognition and spelling, primarily for young children. The device comprises a display window, a plurality of different visually-recognizable vowel symbols mounted on the device one of which may be selected and displayed at the display window, and means for displaying a plurality of additional alphabetical symbols at the display window to form a word in conjunction with the selected vowel symbol, each different vowel symbol being colored in a color the pronunciation of the vowel of which has a phonetic relationship with the desired pronunciation of the respective vowel symbol. The mode of construction of my prior device was expensive and involved complicated mechanisms, thereby inhibiting mass production.

SUMMARY OF INVENTION

The present invention relates to a modification of my earlier device but embodying the same teaching principles with respect to word pronunciation, recognition and spelling. When compared with my earlier device, the educational device of the present invention has a much simplified structure and mechanism of operation, permitting it to be produced much more economically than my prior device.

According to the present invention, an educational device comprises a display window, a plurality of different visually recognizable vowel symbols one of which may be displayed at the display window, and a plurality of additional alphabetical symbols which may be displayed at the display window to form a word with the displayed vowel symbol. Each different vowel symbol is colored or displayed on a colored background in a color the pronunciation of the vowel of which has a phonetic relationship with the desired pronunciation of the respective vowel symbol. The symbols are mounted on rotatable members.

Preferably there are at least three rotatable members, one bearing the vowel symbols about its periphery and the others bearing consonants, non-sounding letters or blank spaces about their periphery (i.e. "alphabetical symbols") to enable the desired word to be formed. The consonants or non-sounding letters provided on the individual rotatable members may be single letters or combinations of two or more letters. Manipulation of the different rotatable members permits selection of letters as desired to form a word at the display window. Alternatively, the rotatable members may be arranged to accommodate other patterns, for example the consonant-vowel-consonant-vowel-consonant patterns as in the word 'begin' would use five rotatable members. Further, four rotatable members may bear consonant, non-sounding letters or blanks about their periphery, so as to permit larger words to be displayed.

BRIEF DESCRIPTION OF DRAWINGS

FIG. 1 is a front elevational view of an educational device constructed in accordance with one embodiment of the invention and employing three rotatable discs or wheels;

FIG. 2 is a perspective exploded view of the device of FIG. 1;

DESCRIPTION OF PREFERRED EMBODIMENTS

Figure 3:
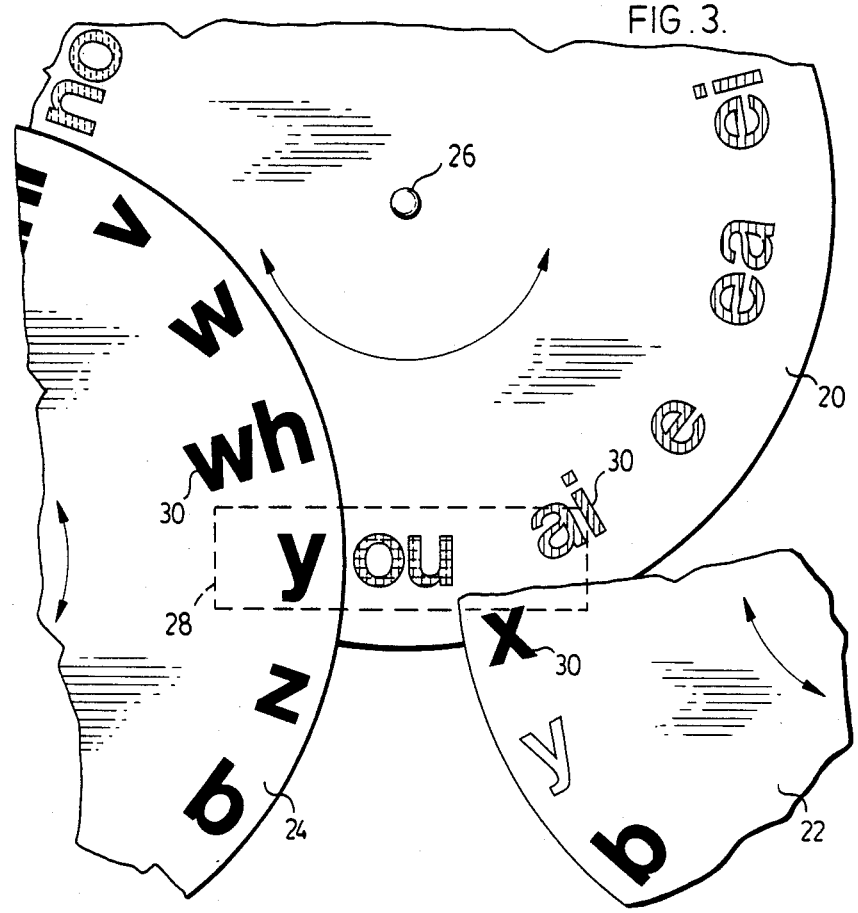
FIG. 3 is a close-up view of the three discs of FIG. 1.

Referring first to FIGS. 1 to 3 of the drawings, an educational aid device 10 comprises a rectangular body 12 having front and rear panels 14 and 16 separated by and joined together through spacers 18. The spacers 18 are configured to permit three rotatable discs or wheels 20, 22 and 24 to be rotatably mounted on respective eyelets 26 on the rear panel 16 or any other convenient mounting means permitting rotation. If desired, the wheels 20, 22 and 24 may be rotatably mounted on the front panel 14 or on both the front and rear panels.

The front panel 14 is formed with a rectangular display window 28. The three rotatable wheels 20, 22 and 24 are each provided with a plurality of letters 30 displayed about its periphery and are mounted in such position with respect to each other and to the window 28 that the letters 30 on their respective peripheries may be brought into adjacent registration at the display window 28 to form words, as shown particularly in FIG. 3.

In order to enable rotation of the respective wheels to be effected to provide the desired registry of letters in the window 28, the wheels 20, 22 and 24 are mounted so as to have a portion thereof 32 protruding from the edge of the body 12. In the arrangement illustrated in FIGS. 1 to 3, the wheels 22 and 24 have a portion thereof protruding at the lower edge of the body 12 at cut-away notches or recesses 34, and the wheel 20 has a portion thereof protruding at the upper edge of the body 12 at a cut-away notch or recess 36. However, it will be understood that the wheels 22 and 24 may be arranged to have portions protruding at the sides of the body 12 or the wheel 20 may be arranged to protrude at the lower edge of the body 12. In addition, the device 10 may be structured with the notches 34 and 36 omitted but with the diameter of the wheels 20, 22 and 24 enlarged to protrude beyond the periphery of the body 12 to achieve the same result. By a user manipulating the protruding portions, each of the wheels 20, 22 and 24 may be rotated to display the desired combination of letters in the window 28. In this embodiment the wheel 20 bears vowel symbols which are colored to facilitate correct pronunciation or, if desired, the vowels may be outlined on an appropriately colored background. Single or multiples of vowel letters may be provided.

Consonants and silent letters are provided on each wheel 22 and 24 and may be arranged to appear in strict alphabetical order or otherwise as desired, with a blank space or spaces also being provided for use in making the words requiring less letters, such as in the example of FIG. 3. Combinations of generally not more than two consonants also may be provided on each of wheels 22 and 24, appropriately interspersed with the other letters. Since each wheel turns in both directions, the blank space generally can be reached within half a turn of a respective wheel.

The external surfaces of the body 12 may be provided with a decorative appearance, instruction or explanation information, or any other indicia, as desired, to add an aesthetic quality to and/or to improve the functionality of the device of the present invention.

Figure 4:
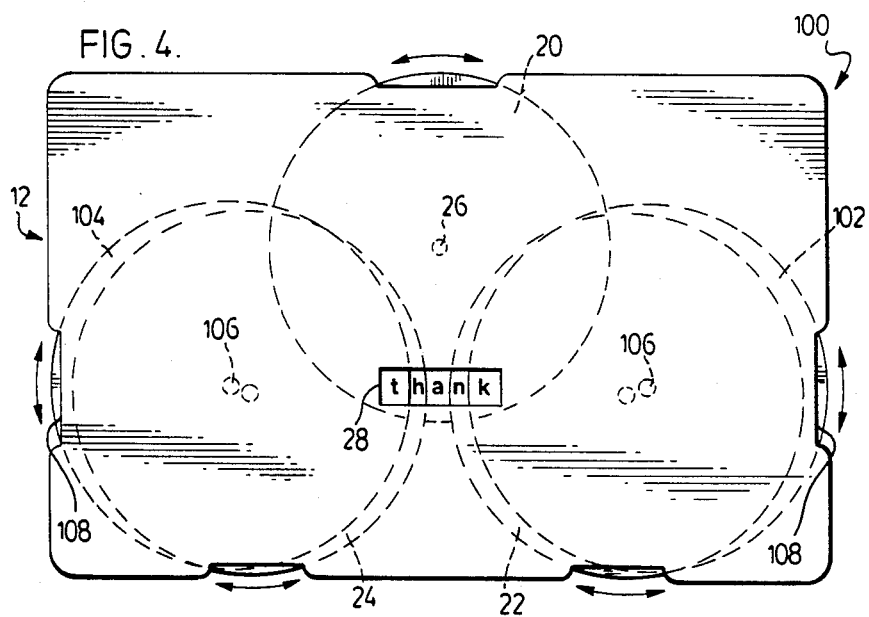
FIG. 4 is a front elevational view of an educational device constructed in accordance with a second embodiment of the invention and employing five rotatable discs or wheels.
Figure 5:
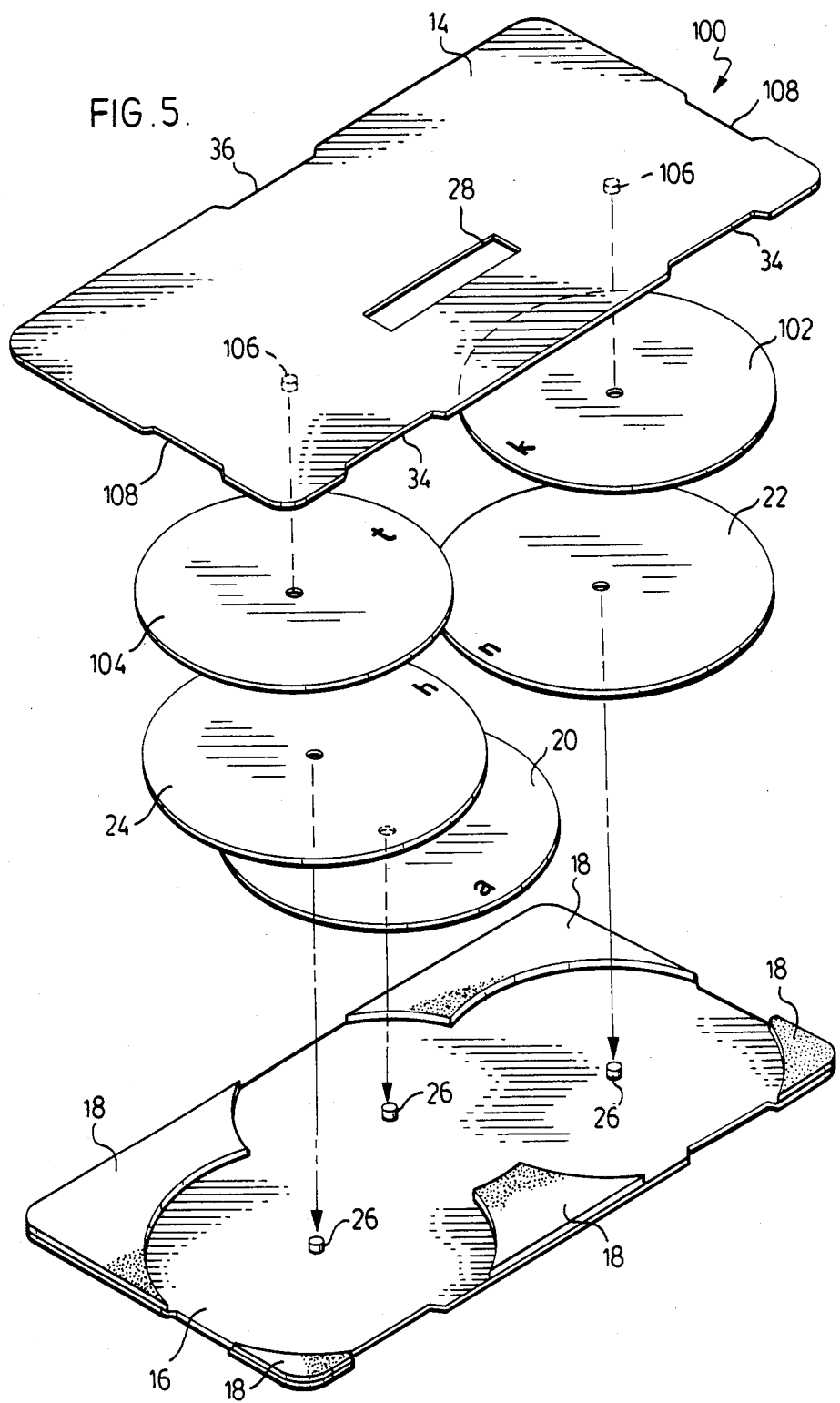
FIG. 5 is a perspective exploded view of the device of FIG. 4.

Referring now to the embodiment of FIGS. 4 and 5, there is illustrated therein an educational aid device 100 which has five discs or wheels instead of the three discs or wheels for the device 10 illustrated in FIGS. 1 to 3. Elements of the device 100 which are common to the device 10 have been labelled with the same reference numerals.

Two additional discs or wheels 102 and 104 are mounted on respective eyelets 106 on the front panel 14, or on any other convenient means which permits rotation of the wheels 102 and 104. If desired, any other convenient mounting arrangement for the wheels 20, 22, 24 102 and 104 may be provided.

The wheels 102 and 104 are provided with consonants, silent letters and blanks on the periphery thereof for display in the window 28, which is elongated with respect to the embodiment of FIGS. 1 to 3 to accommodate the increased number of wheels and to display the resulting longer words.

To permit rotation of the wheels 102 and 104, notches or recesses 108 are provided at the side edges of the body 12. Alternatively, the wheels 102 and 104 may be permitted to protrude from the side edges. Further, if desired, the wheels 102 and 104 may be mounted to be manipulated at the lower edge of the body 12 with the wheels 22 and 24 being mounted to be manipulated at the side edges of the body 12. In another alternative, the wheel 20 may be mounted to be manipulated at the lower edge of the body 12.

The embodiments of FIGS. 1 to 5 have been described with reference to a single disc or wheel bearing single or multiple vowel letters in combination with a plurality of discs or wheels bearing single or multiple consonant letters. Obviously, as desired, various combinations of vowel wheels and consonant wheels may be provided for the teaching and display of longer words. It is also possible to have a mixture of vowels, consonants, silent letters and blanks on one or more of the discs.

Although it is preferred to make the devices 10 and 100 from separate panels it will be understood that the panels could be formed from a single large panel scored so as to fold into place and secured in an appropriate manner. The device may be formed of any desired material of construction, for example, stiff card.

As has been described above with respect to the specific embodiments of FIGS. 1 to 5, the teaching aid device of the invention includes a plurality of color codes and the basic concept is for the parent or teacher to select the colored vowels whose color name contains a vowel sound which is closest to representing the correct vowel sound in the chosen word. For example, if the word m-ea-t is displayed it should be made with the green 'ea' because any vowels displayed in the green color will always be sounded 'ee' as in the word GREEN, no matter what the vowel spelling (e.g. she, meat, bee, field, etc.). To indicate the 'ee' sound in any particular word, green vowels or vowels on a green background are always used. Similarly, if it is desired to indicate the 'eh' sound, for example, as in the words bed, bread, said, etc., then RED colored vowels or vowels on a red background, are employed. The red vowel symbol signifies pronunciation as 'eh', as in the color name red. In this invention, the name of the color always embodies the vowel sound which is to be employed in the word displayed in the window.

The preferred color codes used in this invention are as follows:

GREEN to indicate the 'ee' sound as in the word 'green', for example, lead (green ea);

RED to indicate the 'eh' sound as in the word 'red', for example, lead (red ea);

BLACK to indicate the 'ah' sound as in the word 'black', for example, cat (black a);

PINK to indicate the 'ih' sound as in the word 'pink', for exampe, sit (pink i);

FAWN or less desirably ORANGE to indicate the 'aw' sound as in the words 'fawn' or 'orange', for example, ball (fawn or orange a);

PURPLE to indicate the 'uh' sound (in reality a shortened version of 'uhr' as in the word 'purple'), for example, but, cut and much (purple u);

GREY to indicate 'ey' as in the word 'grey', for example, date, sail and they (grey vowels);

WHITE to indicate 'i' sound as in the word 'white', for example, right, sky and bite (white vowels and 'y');

GOLD to indicate 'oh' sound as in the words 'gold' or 'yellow', for example, hope, boat, toe and sold (gold vowels);

BLUE to indicate 'oo' or 'yoo' sound in the word 'blue', for example, pool, tune and few (blue vowels);

BROWN to indicate 'ow' sound as in the word 'brown', for example, now (ghost w) and found (brown vowels);

TURQUOISE to indicate 'oi' sound as in the word 'turquoise', for example, boil and boy (turqoise vowels); and PINK/BLUE to indicate 'i-oo' sound as in the words 'pink' and 'blue', for example, few and new (pink/blue vowels).

As indicated earlier, the wheels may also include ghost letters in the form of letters printed in outline, so as to indicate that they are not sounded in pronunciation of the displayed word. Ghost letters are used to indicate a silent 'g', for example, in gnome or gnat; a silent 'k', for example in knee, knit, knife or knock; a silent 'u' following 'q'; a silent 'w', for example, in wrist, write or wrong; and a silent 'gh', for example, in fight, light or right. A ghost letter may also be used for a silent letter at the end of a word, for example, a ghost 'e' may be used at ends of words to represent a 'silent e', at the same time using the changed vowel color. For example, the word 'hat' would use a black 'a' but the word 'hate' besides having a ghost 'e' at the end would have a grey vowel 'a'. Similarly, other words such as they, day, cow, new, low, law, hoe and pie can be formed by using the single vowels grey 'e', grey 'a', brown 'o', blue 'e', gold 'o', orange 'a', gold 'o' and white 'i', respectively, in combination with the appropriate ghost letter.

With blue vowel sounds, the main sound is 'oo' or 'yoo' as in blue or tune, but the blue vowels u, oo and ou, are also used to represent a very short open version of the 'oo' sound which approximates the vowel sound of 'u' in pull, or 'oo' in wood, or 'ou' in should.

Vowel sounds before the letter 'r' usually have either a more open, sustained sound such as 'there' (red 'e'), or 'their' (red 'ei') or 'dark' (black 'a'), or they tend to take the neutral 'uhr' sound as in purple, for example, skirt, work and turn (a purple 'i', 'o' and 'u' is usually provided for this purpose).

The education device of the invention may be provided in two levels, a basic level and an advanced level. Set out in Tables I and II are two examples of typical letter combinations in a basic level and an advanced level device, respectively, using three rotatable wheels, the letters provided on the respective wheels being indicated in the Tables, along with the vowel sounds and typical examples.

Tables III and IV are two examples of typical letter combinations for short vowel sounds and long vowel sounds respectively, using five rotatable wheels, the letters provided on the wheels being indicated in the Tables along with the vowel sounds and typical examples.

In these letter combinations, the letters on wheels 1, 2, 4 and 5 are the same for both the short and long vowel sounds.

In one alternative form of teaching device, the wheel bearing the vowels may be provided in detachable snap-on form for releasable attachment to the device in place of the permanent centre wheel 20. Such attachment may be effected using metal or plastic fasteners. An opening would be provided also through the backboard in this embodiment, to enable display of the desired vowel sound to be effected.

Two separate detachable wheels may be provided, one for the long vowel sounds and the other for the short vowel sounds, or a single wheel may be used having the short vowel sounds on one side and the long vowel sounds on the other.

A further possibility is to divide the vowel sounds up on the basis of single and double vowel sounds. However, long and short vowel sounds are established classroom teaching practice and require only six colors passes for each wheel, as opposed to twelve for single and double vowel sounds. It is preferred, therefore, to employ short and long vowel sound wheels.

As may be seen from the Tables I to IV, each of the rotable wheels is provided with letters (or blanks) which may be used to provide a variety of words for pronunciation by selected independent rotation of the wheels until the desired word is displayed in the display window. The vowel color or vowel color background determines the particular vowel pronunciation in the displayed word and various examples are given of words formed by rotation of the respective wheels for the various vowel sounds.

The device also may be used in assisting the pronunciation of translated foreign language words by assigning individual numbers to each letter or group of letters on each of the wheels, as indicated in Tables III and IV. A person wishing to translate a word from a foreign language into English would look up the foreign language word in a dictionary and the dictionary would give the English word along with its pronunciation in a number code. The number code then would be dialed up on the device by appropriate manipulation of the wheels to provide the translation.

For example, the German word "halb" is translated as h-a-lf which number codes as 23-6-2-11-6 for the five wheels. Similarly the French word "tout" is translated as a-11 which number codes as 23-23-3-10-12. The individual numbering of each letter or group of letters may also be employed to simplify word building for parents or teachers.

Since the vowel sounds of the words displayed by the device of the present invention are based upon color, the education device can be employed so as to reflect regional accents by changing the color used for any particular word. For example, a Texan teaching the word "bread" may select a grey 'ea' as opposed to a red one to reflect the local accent, where 'bread' sounds more like the word 'braid'.

SUMMARY OF DISCLOSURE

In summary of this disclosure, the present invention provides a novel educational device to assist in the teaching of word pronunciation, spelling and recognition by the display of vowel symbols which are color-keyed to the desired pronunciation and which form words with displayed consonant letters. Modifications are possible within the scope of this invention.

TABLE I

| | Left Whl | Centre Wheel | Rt Whl | Vowel Color[1] | Vowel Sound | As in | Vowel Sound Examples |
|---|---|---|---|---|---|---|---|
| 1 | b | a | b | Black | "ah" | Bl-a-ck | at, ban, (Ext)[3] are, barn |
| 2 | c | i | ch | Pink | "ih" | P-i-nk | bit, think, zip, etc. |
| 3 | ch | e | ck | Green | "ee" | Gr-ee-n | me, she, we, (Ext) here |
| 4 | d | ea | d | " | "ee" | " | eat, bean, read, (Ext) tear |
| 5 | f | ee | e[2] | " | "ee" | " | knee, queen, (Ext) beer |
| 6 | g | a | f | Orange or Fawn | "aw" | O-range of F-awn | was, ball, thaw, etc. |
| 7 | h | au | g | Orange or Fawn | "aw" | O-range of F-awn | haul, maul, etc. |
| 8 | j | o | gh | Orange or Fawn | "aw" | O-range of F-awn | hot, gone, doll, (Ext) for |
| 9 | k | ou | ght | Orange or Fawn | "aw" | O-range of F-awn | ought, thought, (Ext) four |
| 10 | kn | e | k | Purple | "urh" | P-ur-ple | her, were, stern, (Abb) the |
| 11 | l | ea | ke | " | "urh" | " | earn, learn, yearn, etc. |
| 12 | m | i | l | " | "urh" | " | fir, stir, etc. |
| 13 | n | o | ll | " | "urh" | " | (Abb)[4] some, done, etc. |
| 14 | blank | ou | blank | " | "urh" | " | rough, tough, etc. |
| 15 | p | u | n | " | "urh" | " | fur, (Abb) but, fun, rug |
| 16 | qu | o | ne | Gold | "oh" | G-o-ld | go, show, toe, (Ext) sore |
| 17 | r | oa | p | " | "oh" | " | soap, boat (Ext) soar |
| 18 | s | ou | r | " | "oh" | " | soul, though, (Ext) pour |
| 19 | sh | ai | re | Red | "eh" | R-e-d | said, (Ext) air, fair, chair, etc. |
| 20 | st | e | rn | " | "eh" | " | bed, bend, (Ext) there, where |
| 21 | t | ea | s | " | "eh" | " | thread, read, (Ext) tear, bear |
| 22 | th | ei | sh | " | "eh" | " | (Ext) heir, their, etc. |
| 23 | thr | | st | | | | |

TABLE I-continued

| | Left Whl | Centre Wheel | Rt Whl | Vowel Color[1] | Vowel Sound | As in | Vowel Sound Examples |
|---|---|---|---|---|---|---|---|
| 24 | v | | t | | | | |
| 25 | w | | te | | | | |
| 26 | wh | | w | | | | |
| 27 | y | | x | | | | |
| 28 | | | | | | | |

Notes:
[1] Alternatively the vowel background color in Tables I to IV
[2] Those letters underlined in Tables I to IV are silent or non-pronounced letters
[3] (Abb) = Abbreviated Vowel Sound in Tables I to IV
[4] (Ext) = Extended Vowel Sound in Tables I to IV

TABLE II

| | Left Whl | Centre Wheel | Rt Whl | Vowel Color | Vowel Sound | As in | Vowel Sound Examples |
|---|---|---|---|---|---|---|---|
| 1 | b | a | b | Gray | "ay" | Gr-ay | day, sale, tray, etc. |
| 2 | bl | ai | ch | " | "ay" | " | fail, trail, grain, etc. |
| 3 | c | e | ck | " | "ay" | " | they, whey, etc. |
| 4 | d | ea | d | " | "ay" | " | great, steak, etc. |
| 5 | f | oy | f | Turquoise | "aw-i" | Tur-quoi-se | boy, joy, toy, etc. |
| 6 | g | oi | g | " | "aw-i" | " | oil, coin, noise, etc. |
| 7 | gr | ou | gh | Brown | "ah-u" | Br-ow-n | house, bough, (Ext) hour |
| 8 | h | ow | ght | " | "ah-u" | " | now, gown, fowl, etc. |
| 9 | j | i | k | White | "ah-i" | Wh-i-te | bike, night, (Ext) fire |
| 10 | kn | ie | ke | " | "ah-i" | " | lie, pie, tie, etc. |
| 11 | l | u | l | " | "ah-i" | " | buy, guy, etc. |
| 12 | m | y | ld | " | "ah-i" | " | by, my, sty, etc. |
| 13 | n | o | le | Blue | "oo" | Bl-ue | do, to, who, etc. |
| 14 | p | oo | n | " | "oo" | " | tooth, food, (Abb) good, wood |
| 15 | qu | ou | ne | " | "oo" | " | soup, through, (Abb) could, would |
| 16 | r | u | p | " | "oo" | " | rude, rule, (Abb) put, bush |
| 17 | s | ue | r | " | "oo" | " | blue, true, sue, etc. |
| 18 | st | e | re | Pink/Blue | "i-oo" | Pink/Blue | dew, few, new etc. |
| 19 | t | u | s | " | "i-oo" | " | tune, use, (Ext) cure, pure |
| 20 | th | blank | se | | | | |
| 21 | thr | | sh | | | | |
| 22 | tr | | st | | | | |
| 23 | v | | t | | | | |
| 24 | w | | th | | | | |
| 25 | wh | | w | | | | |
| 26 | y | | x | | | | |
| 27 | z | | y | | | | |
| 28 | blank | | blank | | | | |

TABLE III*

| | Wheel Numbers | | | | | Vowel Color | Vowel Sound | As in | Vowel Sound Examples |
|---|---|---|---|---|---|---|---|---|---|
| | 1 | 2 | 3 | 4 | 5 | | | | |
| 1 | b$^1$ | b$^1$ | i$^1$ | b$^1$ | b$^1$ | PINK | 'ih' | P-i-nk | rink, fizz, zip |
| 2 | c$^2$ | c$^2$ | a$^2$ | c$^2$ | ce$^2$ | BLACK | 'ah' | Bl-a-ck | cat, strap, (Ext) car, far |
| 3 | d$^3$ | d$^3$ | a$^3$ | d$^3$ | ch$^3$ | FAWN | 'aw' | F-aw-n | all, fall, malt |
| 4 | f$^4$ | f$^4$ | o$^4$ | e$^4$ | d$^4$ | " | " | " | (Abb) pond, doll, got |
| 5 | g$^5$ | g$^5$ | au$^5$ | f$^5$ | e$^5$ | " | " | " | haul, cause |
| 6 | g$^6$ | h$^6$ | ou$^6$ | g$^6$ | f$^6$ | " | " | " | four, ought |
| 7 | k$^7$ | j$^7$ | e$^7$ | g$^7$ | g$^7$ | PURPLE | 'urh' | P-u-rple | her, were, (Abb) the |
| 8 | p$^8$ | k$^8$ | i$^8$ | h$^8$ | ge$^8$ | " | " | " | fir, shirt, swirl |
| 9 | q$^9$ | l$^9$ | o$^9$ | k$^9$ | h$^9$ | " | " | " | word, work, (Abb) come, some |
| 10 | s$^{10}$ | m$^{10}$ | u$^{10}$ | l$^{10}$ | h$^{10}$ | " | " | " | fur, turn, (Abb) hum, sum |
| 11 | sc$^{11}$ | n$^{11}$ | ea$^{11}$ | l$^{11}$ | ht$^{11}$ | " | " | " | earth, earn, learn |
| 12 | sh$^{12}$ | p$^{12}$ | ou$^{12}$ | m$^{12}$ | k$^{12}$ | " | " | " | young, rough, tough |
| 13 | sp$^{13}$ | r$^{13}$ | ou$^{13}$ | n$^{13}$ | l$^{13}$ | BROWN | 'ah-oo' | Br-ow-n | round, our, foul |
| 14 | sq$^{14}$ | s$^{14}$ | o$^{14}$ | p$^{14}$ | m$^{14}$ | " | " | " | how, tower, fowl |
| 15 | st$^{15}$ | t$^{15}$ | a$^{15}$ | r$^{15}$ | n$^{15}$ | RED | 'eh' | R-e-d | (Ext) bare, care, fare |
| 16 | t$^{16}$ | u$^{16}$ | e$^{16}$ | s$^{16}$ | p$^{16}$ | " | " | " | sled, get (Ext) there, where |
| 17 | th$^{17}$ | v$^{17}$ | ai$^{17}$ | t$^{17}$ | r$^{17}$ | " | " | " | said, (Ext) fair, hair |
| 18 | w$^{18}$ | w$^{18}$ | ea$^{18}$ | v$^{18}$ | s$^{18}$ | " | " | " | bread, lead (Ext) bear, pear |
| 19 | w$^{19}$ | y$^{19}$ | ei$^{19}$ | w$^{19}$ | se$^{19}$ | " | " | " | (Ext) heir, their |
| 20 | 20 | z$^{20}$ | 20 | x$^{20}$ | t$^{20}$ | | | | |
| 21 | 21 | 21 | 21 | y$^{21}$ | th$^{21}$ | | | | |
| 22 | 22 | 22 | 22 | z$^{22}$ | z$^{22}$ | | | | |
| 23 | 23 | 23 | 23 | 23 | 23 | | | | |

*Short Vowel Sounds

TABLE IV*

| Wheel Numbers | | | | | Vowel Color | Vowel Sound | As in | Vowel Sound Examples |
|---|---|---|---|---|---|---|---|---|
| 1 | 2 | 3 | 4 | 5 | | | | |
| 1 $b^1$ | $b^1$ | $a^1$ | $b^1$ | $b^1$ | GRAY | 'ay' | Gr-ay | day, mat$\underline{e}$, sal$\underline{e}$ |
| 2 $c^2$ | $c^2$ | $e^2$ | $c^2$ | $ce^2$ | " | " | " | they, whey |
| 3 $d^3$ | $d^3$ | $ai^3$ | $d^3$ | $ch^3$ | " | " | " | wait, train |
| 4 $f^4$ | $f^4$ | $ea^4$ | $\underline{e}^4$ | $d^4$ | " | " | " | break, great, steak |
| 5 $g^5$ | $g^5$ | $ei^5$ | $\overline{f}^5$ | $e^5$ | " | " | " | deign, feign, reign |
| 6 $\underline{g}^6$ | $h^6$ | $oi^6$ | $g^6$ | $\overline{f}^6$ | TURQUOISE | 'aw-i' | Turqu-oi-se | oil, foil, coin |
| 7 $\underline{k}^7$ | $j^7$ | $oy^7$ | $\underline{g}^7$ | $g^7$ | " | " | " | boy, joy, toy |
| 8 $\overline{p}^8$ | $k^8$ | $a^8$ | $\underline{h}^8$ | $g\underline{e}^8$ | GOLD | 'oh' | G-o-ld | all, ball, call (or use FAWN) |
| 9 $q^9$ | $l^9$ | $o^9$ | $k^9$ | $\overline{h}^9$ | " | " | " | go, no, ho$\underline{e}$, roll |
| 10 $s^{10}$ | $m^{10}$ | $oa^{10}$ | $l^{10}$ | $h^{10}$ | " | " | " | goat, goal, road |
| 11 $sc^{11}$ | $n^{11}$ | $ou^{11}$ | $l^{11}$ | $\underline{ht}^{11}$ | " | " | " | though, pour, soul |
| 12 $sh^{12}$ | $p^{12}$ | $e^{12}$ | $\overline{m}^{12}$ | $k^{12}$ | GREEN | 'ee' | Gr-ee-n | he, me, she, we |
| 13 $sp^{13}$ | $r^{13}$ | $ea^{13}$ | $n^{13}$ | $l^{13}$ | " | " | " | lead, pleas$\underline{e}$, dream |
| 14 $sq^{14}$ | $s^{14}$ | $ee^{14}$ | $p^{14}$ | $m^{14}$ | " | " | " | heed, qu$\underline{e}$en, (Ext) beer |
| 15 $st^{15}$ | $t^{15}$ | $i^{15}$ | $r^{15}$ | $n^{15}$ | WHITE | 'ah-i' | Wh-i-te | knif$\underline{e}$, writ$\underline{e}$, night |
| 16 $t^{16}$ | $\underline{u}^{16}$ | $y^{16}$ | $s^{16}$ | $p^{16}$ | " | " | " | by, my, fly, cry |
| 17 $th^{17}$ | $\overline{v}^{17}$ | $ie^{17}$ | $t^{17}$ | $r^{17}$ | " | " | " | die, lie, pie, tie |
| 18 $w^{18}$ | $w^{18}$ | $e^{18}$ | $v^{18}$ | $s^{18}$ | BLUE | 'yoo' | Bl-ue | dew, few, new |
| 19 $\underline{w}^{19}$ | $y^{19}$ | $o^{19}$ | $\underline{w}^{19}$ | $s\underline{e}^{19}$ | " | 'oo' | " | do, to, who |
| 20 $\overline{20}$ | $z^{20}$ | $oo^{20}$ | $x^{20}$ | $t^{20}$ | " | " | " | zoo, (Abb) good, blood |
| 21 21 | 21 | $ou^{21}$ | $y^{21}$ | $th^{21}$ | " | " | " | through, (Abb) could, would |
| 22 22 | 22 | $u^{22}$ | $\overline{z}^{22}$ | $z^{22}$ | " | 'oo' or 'yoo' | " | cut$\underline{e}$, (Abb) pull, push |
| 23 23 | 23 | $ue^{23}$ | 23 | 23 | " | 'oo' or 'yoo' | " | clue, blue, true |

*Long Vowel Sounds

What I claim is:

1. An educational device provided in planar generally rectangular form, comprising:
   a first planar support member having a front face and a back face;
   a display window constituted by a rectangular cutaway in the front face of the planar support member;
   a plurality of different visually-recognizable vowel symbols provided adjacent the periphery of a first rotatable member mounted to said support member, one of which vowel symbols may be displayed at the display window by rotation of said first rotatable member, each different vowel symbol comprising single vowel letter/or multiple vowel letters for a word to be displayed in the display window and being coloured or displayed on a coloured background in a colour the pronunciation of the vowel of which has a phonetic relationship with the desired pronunciation of the respective vowel symbol; and
   a plurality of additional alphabetical symbols provided adjacent the periphery of at least second and third rotatable members mounted to said support member, which additional alphabetical symbols may be displayed at the display window by rotation of said second and/or third rotatable members to form a word with the displayed vowel symbol at the display window;
   said rotatable members being mounted to said support member with their axes forming a triangle with a peripheral portion of said first rotatable member protruding from one longitudinal edge of said support member and with a peripheral portion of each of said second and third rotatable members protruding from another longitudinal edge of said support member to enable rotation of said rotatable members to be effected by manual manipulation of said protruding peripheral portions of said rotatable members.

2. The device of claim 1 including two additional rotatable members mounted to said support member and bearing additional alphabetical symbols for display at the display window by rotation of said additional alphabetical symbols, and wherein said two additional rotatable members are mounted with respect to said support member such that the axes thereof and the axis of said first rotatable member form a triangle with a peripheral portion of one of said additional rotatable members protruding from one side edge of said support member and with a peripheral portion of the other of said additional rotatable members protruding from another side edge of said support member to enable rotation of said additional rotatable members to be effected by manual manipulation of said protruding peripheral portions of said additional rotatable members.

3. The device of claim 2 wherein the alphabetical symbols on each of said second and third rotatable members and each of said additional rotatable members comprise single consonant letters, silent letters and blanks.

4. The device of claim 3 wherein said alphabetical symbols also include multiple consonant letters.

5. The device of claim 1 wherein said vowel symbols comprise only short vowel sounds.

6. The device of claim 1 wherein said vowel symbols comprise only long vowel sounds.

7. The device of claim 1 wherein said second and third rotatable members are mounted to said support members in substantially non-releasable relationship therewith, and, said first rotatable member is selectively releasably mounted to said support member for interchange of different ones of said first rotatable member bearing different forms of vowel symbols.

8. The device of claim 7 further comprising fourth and fifth rotatable members bearing additional alphabetical symbols for display at the display window by rotation thereof, said fourth and fifth rotatable members being mounted to said support member in substantially non-releasable relationship therewith.

9. The device of claim 8 wherein said different ones of said first rotatable member comprises one such first rotatable member bearing short vowel sounds and a separate such first rotatable member bearing long vowel sounds.

10. The device of claim 8 wherein said different ones of said first rotatable member comprises a single rotatable member bearing short vowel sounds on one side and long vowel sounds on the other.

11. An educational device, comprising:

a first generally rectangular planar member, a second generally rectangular planar member spaced apart from said first generally rectangular planar member, an elongate window opening formed through said second generally rectangular planar member, a first rotatable member mounted between said first and second rectangular planar members for rotation about an axis, said first rotatable member bearing a plurality of different visually-recognizable vowel symbols, either in the form of a colored letter or combination of colored letters or a letter or combination of letters on a colored background, the color being correlated to the desired vowel sound, said plurality of vowel sounds being located at arcuately-spaced locations on said first rotatable member so as to be selectively individually displayed in said window upon rotation of said first rotatable member, a second rotatable member mounted between said first and second rectangular planar members for rotation about an axis, said second rotatable member bearing a plurality of additional alphabetical symbols comprising consonants, non-sounding letters and blanks, said additional alphabetical symbols being located at arcuately-spaced locations on said second rotatable member so as to be selectively individually displayed in said window upon rotation of said second rotatable member, and a third rotatable member mounted between the first and second rectangular planar members for rotation about an axis, said third rotatable member bearing a plurality of further alphabetical symbols comprising consonants, non-sounding letters and blanks, said further alphabetical symbols being located at arcuately-spaced locations on said third rotatable member so as to be selectively individually displayed in said window upon rotation of said third rotatable member, said first, second and third rotatable members being mounted and arranged in relation to each other and said window so that desired words comprising the vowel symbols, the additional alphabetical symbols and the further alphabetical symbols may be displayed in the window by selective independent rotation of the rotatable members.

12. The device of claim 11, wherein fourth and fifth rotatable members are mounted between the first and second rectangular panel members for rotation about an axis, each said fourth and fifth rotatable members bearing yet further alphabetical symbols, said yet further alphabetical symbols being located at arcuately-spaced locations on both said fourth and fifth rotatable members so as to be selectively individually displayed in said window upon independent rotation of said fourth and fifth rotatable members.

13. The device of claim 12 wherein each of said rotatable members has a diameter in relation to the dimensions of said planar members such that the periphery of each rotatable member is digitally engageable to effect rotation thereof.

14. The device of claim 13 wherein the periphery of each of said planar members is inwardly notched in the region of said periphery of said rotatable member.

15. The device of claim 11 wherein the external surfaces of said first and second rectangular planar members bear indicia.

* * * * *